(12) United States Patent
Erdmann et al.

(10) Patent No.: US 9,797,308 B2
(45) Date of Patent: Oct. 24, 2017

(54) COVER ASSEMBLY

(71) Applicant: REINZ-DICHTUNGS-GMBH, Neu-Ulm (DE)

(72) Inventors: Christoph Erdmann, Ulm (DE); Francesco Zitarosa, Illertissen (DE)

(73) Assignee: Reinz-Dichtungs-GmbH, Neu-Ulm (DE)

( * ) Notice: Subject to any disclaimer, the term of this patent is extended or adjusted under 35 U.S.C. 154(b) by 103 days.

(21) Appl. No.: 13/261,998

(22) PCT Filed: Jun. 14, 2013

(86) PCT No.: PCT/EP2013/062329
§ 371 (c)(1),
(2) Date: Dec. 9, 2014

(87) PCT Pub. No.: WO2013/186337
PCT Pub. Date: Dec. 19, 2013

(65) Prior Publication Data
US 2015/0144091 A1 May 28, 2015

(30) Foreign Application Priority Data
Jun. 16, 2012 (DE) .................. 20 2012 005 909 U

(51) Int. Cl.
| F02M 25/00 | (2006.01) |
| F02F 7/00 | (2006.01) |
| F02B 77/02 | (2006.01) |
| F01M 13/04 | (2006.01) |
| F02F 1/24 | (2006.01) |
| B01D 45/16 | (2006.01) |
| F01M 13/00 | (2006.01) |

(52) U.S. Cl.
CPC ............. *F02B 77/02* (2013.01); *F01M 13/00* (2013.01); *F01M 13/0416* (2013.01); *F02F 1/24* (2013.01); *F02F 7/006* (2013.01); *B01D 45/16* (2013.01); *F01M 2013/005* (2013.01); *F01M 2013/0066* (2013.01); *F01M 2013/0427* (2013.01); *F01M 2013/0433* (2013.01)

(58) Field of Classification Search
CPC ...... F01M 13/00; F01M 13/04; F01M 13/021; F01M 13/0416; F01M 2013/005; F02F 1/24; F02F 7/006; F02B 77/02
USPC ................... 123/41.86, 198 E, 198 R, 195 C
See application file for complete search history.

(56) References Cited

U.S. PATENT DOCUMENTS

| 4,723,529 A * | 2/1988 | Yokoi ................ F01M 13/0416 123/41.86 |
| 7,096,847 B1 * | 8/2006 | Nation ............... F01M 13/0416 123/198 E |
| 7,137,372 B2 | 11/2006 | Hilpert et al. |

(Continued)

FOREIGN PATENT DOCUMENTS

| DE | 19701977 A1 | 7/1998 |
| DE | 102004004753 A1 | 8/2005 |

(Continued)

*Primary Examiner* — Syed O Hasan
(74) *Attorney, Agent, or Firm* — Marshall & Melhorn, LLC

(57) ABSTRACT

The invention relates to a cover assembly for covering of a cylinder head with a lid, a frame and at least one air-oil separator, as well as the use of such a cover assembly as an enclosure for at least one cylinder head of a combustion engine of a vehicle or a combustion engine for stationary use.

32 Claims, 7 Drawing Sheets

(56) References Cited

U.S. PATENT DOCUMENTS

| | | |
|---|---|---|
| 7,743,742 B2 | 6/2010 | Wagner et al. |
| 7,785,401 B2 | 8/2010 | Wagner et al. |
| 7,842,115 B2 * | 11/2010 | Brand ............... B01D 19/0063 123/198 E |
| 8,113,185 B2 | 2/2012 | Song |
| 8,252,079 B2 | 8/2012 | Gruhler et al. |
| 2008/0105494 A1 * | 5/2008 | Lemke ............... F01M 13/0011 184/6.23 |

FOREIGN PATENT DOCUMENTS

| | | |
|---|---|---|
| DE | 102004011176 A1 | 10/2005 |
| DE | 102004011177 A1 | 10/2005 |
| DE | 102004037157 A1 | 3/2006 |
| DE | 202006017548 U1 | 2/2007 |
| DE | 102005048331 A1 | 4/2007 |
| DE | 102006008516 A1 | 8/2007 |
| DE | 102006039355 A1 | 3/2008 |
| DE | 202007009222 U1 | 7/2008 |
| DE | 102007012483 A1 | 9/2008 |
| DE | 102009005224 A1 | 1/2010 |
| DE | 102008038018 A1 | 2/2010 |
| DE | 102008038020 A1 | 2/2010 |
| DE | 102008050039 A1 | 2/2010 |
| DE | 102008058473 A1 | 6/2010 |
| DE | 102010025096 B3 | 1/2012 |
| EP | 1559876 A2 | 8/2005 |
| FR | 2913054 A1 | 8/2008 |
| JP | 2002235520 * | 8/2002 |
| JP | 2002235520 A | 8/2002 |
| JP | 2009299613 A | 12/2009 |
| WO | 2009/066856 A1 | 5/2009 |

* cited by examiner

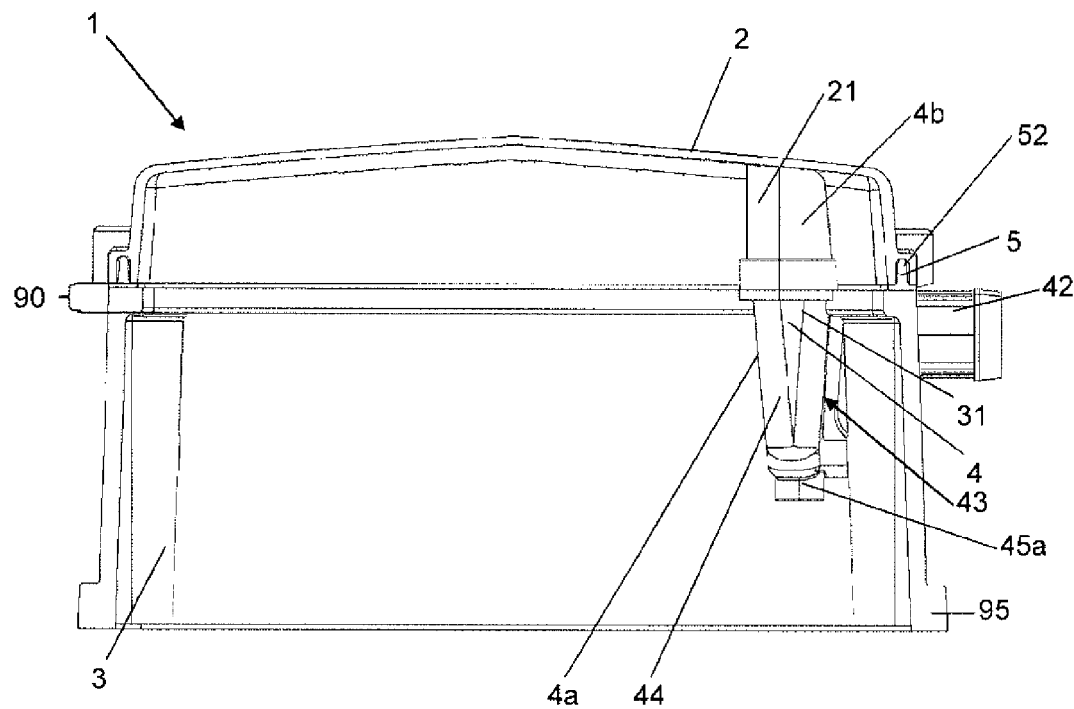
Fig. 3
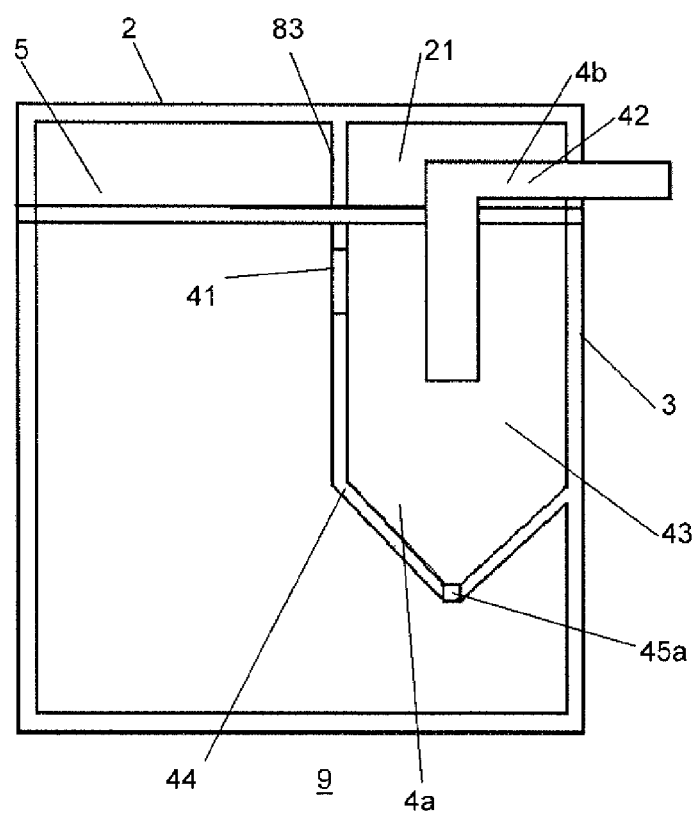
Fig. 4-a

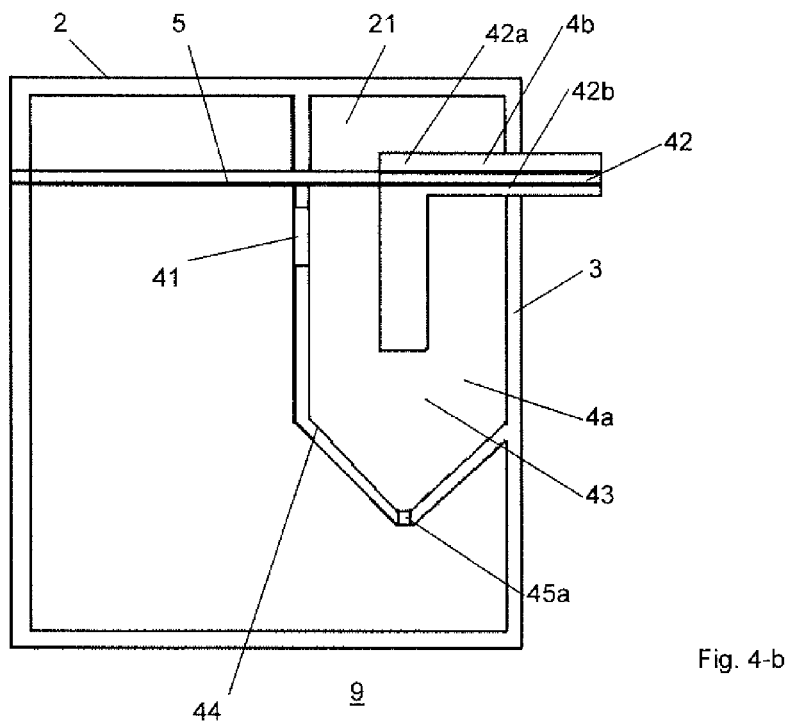
Fig. 4-b
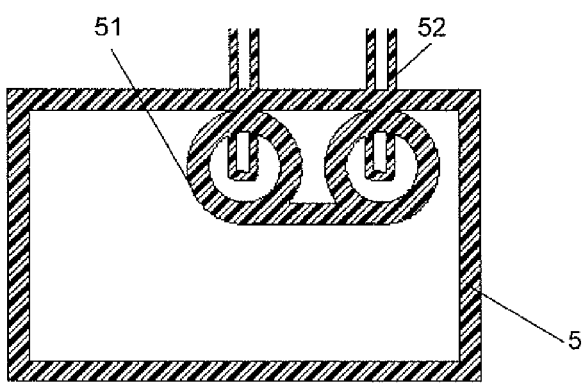
Fig. 5-a
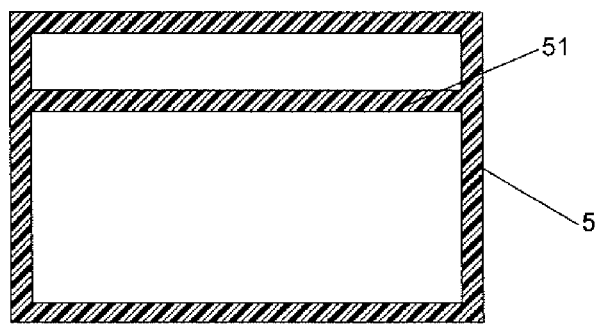
Fig. 5-b

COVER ASSEMBLY

BACKGROUND OF THE INVENTION

The invention relates to a cover assembly for covering of a cylinder head with a lid, a frame and at least one air-oil separator, as well as the use of such a cover assembly as an enclosure for at least one cylinder head of a combustion engine of a vehicle or a combustion engine for stationary use.

Cover assemblies for covering cylinder heads are generally known from the state of the art. Examples are DE 10 2006 039 355 A1, in which the complete cover assembly is designed with two shells, or cover assemblies with integrated air-oil separation, as known from DE 10 2004 011 177 A1 or DE 10 2004 004 753 A1.

With utility vehicles, especially such utility vehicles where the engine is orthogonally installed below the driver's cabin or below the tail area and where either the driver's cabin cannot be inclined or the tail area is anyway part of a larger area, such as with busses, in case of service or repair the problem exists that the space available above the engine and its cover is not sufficient in order to remove the complete cover from the engine. This problem can be circumvented by designing the cover as multi-part and that it comprises at least a lid with a small height and a frame. In a service case, the lid can be removed while the frame remains on the engine, with the relevant positions getting uncovered in a sufficient manner. Such a multi-part cover assembly is mentioned as a side aspect in DE 10 2010 025 096 A1.

With such a multi-part cover assembly, one is confronted with the problem how to integrate the air-oil separation system, as the air-oil separation system usually requires the complete height of the covering assembly and blocks a removal of the lid.

BRIEF SUMMARY OF THE INVENTION

It is therefore the object of the present invention to provide for a cover for one or several cylinder heads, which consists in a lid and a frame but nevertheless comprises at least one air-oil separator, with the at least one air-oil separator being integrated in such a manner to the cover that it is possible to dismount both the complete cover from the cylinder head and the lid from the frame without any complication due to the air-oil separator. In addition, it shall be possible to produce the cover in a simple and cost efficient manner in large series.

The invention thus relates to a cover assembly for covering a cylinder head, which consists in a lid, a frame, at least one air-oil separator as well as at least one frame compartment. The frame compartment in part is delimited by the frame and in part by a partition wall which partition wall branches off the frame, this way it forms a subunit of the frame. Thus, at least one partition wall branches off the frame, which together with a section of the wall of the frame forms a frame compartment within the frame. The at least one air-oil separation element consists in at least two elements, one of which is integrally formed with the frame at least in sections and arranged inside of the frame compartment. At least one other element of the air-oil separator extends at least in sections within the cover.

A frame in the sense of this invention always comprises circumferential walls. The upper and lower boundary surface of the frame, thus the boundary surface pointing towards the lid and the boundary surface pointing towards the cylinder head in the installed state are however not closed. At least 60%, preferably at least 70%, most preferably at least 80% of the boundary surfaces are not filled with material. Only a small percentage of these boundary surfaces are filled with material, which mainly comprises the circumferential walls and bridges linking these circumferential walls. On both boundary surfaces, the frame shows no broad collars as delimiting elements. The frame is designed in such a way that its circumferential walls, at least with their main direction of extension extend under an angle of 70 to 110° relative to the boundary surfaces. This main direction of course disregards local structures of the frame.

The lid is always designed in such a way that it has a closed surface on its side pointing away from the frame. Such closed surface may however comprise small passage holes. On its boundary surface facing the frame, the lid is not closed. As for the frame at this boundary surface, at least 60%, preferably at least 70%, most preferably at least 80% of the boundary surfaces are not filled with material.

It is advantageous if a gasket is arranged between the lid and the frame in a circumferential manner, so that the frame circumferentially adjoins to the lid while securing a gasket between them. Thus, the gasket seals between the free end of the lid and one edge of the frame. It is preferred that the lid and the frame are connected with each other in a form-locking manner, e.g. using a screw connection at the outer edge of frame and lid.

It is preferred that the lid comprises a lid compartment, which is integrally formed with the lid. Here again, a partition wall may be provided. If a lid compartment is given, then the other element of the air-oil separator is preferably arranged within the lid compartment.

It is further preferred that the gasket comprises branching sections, where in the connected state of lid and frame, the branching sections of the gasket seal the lid compartment against the frame compartment. Thus, lid compartment, gasket or branching sections of the gasket and frame compartment together form a compartment within the cover assembly. The air-oil separator is preferably arranged within the compartment, so that it is enclosed by the compartment. In this context, it is further preferred if at least one element of the air-oil separator is situated in the lid compartment and at least one element of the air-oil separator is situated in the frame compartment.

Frame and lid are generally arranged relative to each other in such a way that one of these parts comprises a groove, which takes up the gasket, while the free end of the gasket rests on the other part and is compressed in its elastic range due to the screw-connection of the parts. As an alternative, the gasket can also be arranged in a groove which forms radially between the two parts. Then, the sealing is effected in a radial manner. While a defined borderline is given between the frame and the lid in the area of the gasket, elements of the frame can project into the lid, while elements integrated into the lid can project into the frame. If the frame comprises so-called bridges, thus elements for the guidance of integrated wires, e.g. electrical wires, which in most cases connect the longitudinal sides of the frame, it is in fact common that at least one of these bridges extends beyond the above-mentioned borderline between frame and lid into the lid. If such bridges are present, the invention is to be understood in such a way that the element of the air-oil separator arranged inside the frame do not reach beyond the most widely protruding point of e.g. the at least one bridge.

The connection of the air-oil separator elements with each other in the same way as the connection of the lid compartment with the frame compartment can be facilitated by positioning devices, which protrude beyond the border plane formed by the borderlines. If positioning devices are given in the frame or the lid, which positioning devices protrude beyond the border line, they here also define the outermost point, beyond which the respective elements do not protrude. In most cases, the cover assembly will thus comprise an overlapping area of frame and lid.

It is further preferred if the compartment comprises at least one inlet for oil-carrying crankcase ventilation gas which inlet points towards the inner chamber of the cover assembly, as well as an outlet for purified crankcase gas, which outlet points towards the outer chamber of the cover assembly. Preferably, the outlet for purified crankcase gas is integrally formed with one of the parts of the cover assembly, namely with the lid or the frame. It depends on the working principle of the air-oil separator whether an integration into the lid or into the frame is to be preferred.

In a first advantageous embodiment, the air-oil separator is a cyclone, to be more precise a counter-flow cyclone. It comprises at least one funnel-shaped element, which is integrally formed with the frame and located inside the frame compartment. The crankcase ventilation gas to be cleaned tangentially flows into the air-oil separator. The inlet pipe for the gas is preferably arranged in the inner chamber of the frame. Inside of the funnel-shaped element, the crankcase ventilation gas flows circumferentially. Centrifugal force causes that particles and oil droplets which are contained in the gas are separated and drain off. In contrast, the purified gas is preferably discharged via a pipe in the direction of the lid. The pipe can be integrally formed with the lid, but preferably protrudes beyond the borderline of lid and frame. Another advantageous embodiment provides that the pipe is formed as a separate part and can be dismounted in the same way as the lid from the frame and therefore can be removed without a large demand in space in a direction opposite to the frame.

The funnel-shaped element of the at least one air-oil separator preferably comprises an outlet for separated oil with this outlet being preferably situated at the tip of the funnel-shaped element. Advantageously, the funnel-shaped element in the installed situation in the vehicle is arranged in such a way that the outlet at the tip of the funnel-shaped element allows for an outflow of the separated gas only by means of gravitation, preferably the outlet of the funnel-shaped element thus forms the geodetically lowest point of the air-oil separator.

In another advantageous embodiment of the invention, the compartment comprises at least one wall arranged in the inner chamber of the compartment which wall acts as air-oil separator. This wall extends transversely to the flowing direction of the crankcase gases. In this context, it is preferred if the wall only extends in sections between the lower end of the compartment and the inner ceiling of the lid. The wall then preferably either extends completely in the lid compartment or completely in the frame compartment from the partition wall separating the compartment until the wall of the lid or the frame. Advantageously, the wall extends over the complete cross section of lid or frame or omits a marginal area pointing towards the complimentary part, thus pointing towards the frame or the lid. It is particularly advantageous if in the cover assembly at least two walls are arranged one behind the other in the flow direction of the crankcase ventilation gas with the walls extending transversely to the flow direction of the crankcase ventilation gas and each omitting at least one passage opening. It is preferred if walls arranged in the frame compartment alternate with walls arranged in the lid compartment. Here, the passage omitted by the first wall when projected into the plane of the second wall is not congruent with the passage omitted by the second wall. The crankcase ventilation gas flowing through the compartment thus on its way through the compartment experiences a redirecting, which causes a separation of particles and droplets contained in the gas. A larger number of redirecting walls is principally preferred; it will usually range between three and seven. The space available and the desired degree of redirection are the decisive factors for this. As a whole, a so-called labyrinth separator is formed.

In another advantageous embodiment the cover assembly comprises a wall which is situated inside the compartment and acts as an air-oil separator. The wall extends transversely to the flow direction of the crankcase ventilation gas and comprises several passage openings which act as actual air-oil separators. The wall here preferably consists of two sections, each of which—apart from the passage openings—extends over the complete cross section of frame compartment and lid compartment, respectively and this way forms a partition. The bordering plane between frame and lid thus here as well forms the partition plane of the wall; one element of the wall extends in the frame, one in the lid.

In a first preferable variation the passage openings of the wall are designed as holes, e.g. with cylindrical cross sections or conical cross sections tapering in the flow direction. Preferably, the cover assembly comprises an impaction wall arranged behind the wall. The impaction wall can be an integral wall different from the wall of the compartment, of the lid or of the frame or the actual wall of the compartment, of the lid and/or of the frame. The crankcase ventilation gas here undergoes an acceleration due to the reduction of the cross section. The acceleration has a different effect on the actual gas and the droplets and parts carried in the gas so that a separation between gas and carried-on particles and droplets is achieved. The conically tapering design of the cross section enhances the acceleration and separation effect. The partition wall reinforces the separation effect, as it constitutes an impaction wall for coagulated oil droplets. The separation effect can further be improved when the impaction wall at least in sections is provided with an absorbing material, especially with a fleece. The absorption is effected all over the surface.

In another preferable variation, at least one of the passage openings of the wall comprises a helix-shaped element as air-oil separator. In principle, the helix-shaped element can be inserted as a separate element into the wall. It is however preferred that the helix-shaped is integrally formed with the wall. A preferred embodiment provides that the wall is formed as a simple wall and that the helix-shaped element shows a rotation of the threaded surfaces of 150 to 180°, preferably 175 to 180°. An alternative embodiment provides that the wall is formed as a double wall and that the helix-shaped element over its complete extension through the double wall shows a rotation of the threaded surfaces of 300 to 360°, preferably 350 to 360°. In a further alternative and advantageous embodiment, the wall is also formed as a double wall, but the two sections of the helix-shaped elements show a different rotational direction relative to each other. Such air-oil separators are described in DE 10 2004 011 176 A1.

At least for the wall-based air-oil separators, it is preferred if the cover assembly on the side of the frame compartment pointing away from the lid, in the area located behind the at least one wall in the flow direction of the crankcase ventilation gas shows at least one outlet for separated oil, via which outlet the oil can be led back to the oil pan. The outlet can be preferably be provided with an overflow cap, a siphon or a return valve. In the same way, it is possible to provide at least one valve in the wall or in the partition wall, e.g. a pressure control valve or a bypass valve.

In all embodiments described thus far, it is preferred if the frame compartment extends along a longitudinal wall of the frame, especially if the complete compartment extends along a longitudinal wall of the cover assembly.

The compartment there only occupies a part of the inner space of the cover assembly, preferably at the most half, most preferably only a third of its width. With the arrangement of the air-oil separation in a small compartment, only part of the total space is used.

It is preferred if at least one of the parts—frame or lid including the respective related compartment—consists in a thermoplastic material or comprises such material. It is preferred that polyamide, especially polyamide 6 or polyamide 6.6 is used. It is of course also possible that all parts mentioned consist in polyamide or comprise polyamide. On the other hand, it is also possible that one of the parts consists in an aluminium allow and is combined with a part made from polyamide.

With respect to the gasket, it is possible to use carrier-frame gaskets or profiled rubber gaskets. Profiled rubber gaskets preferably consists in FPM (fluoroelastomere rubber), FVMQ (fluorosilicone rubber), polyacrylates, especially ACM alkyl acrylate copolymer, AEM (ethylene acrylic rubber), in HNBR (hydrated nitrile butadiene rubber), NBR (nitrile butadiene rubber), EVM (Ethylene-vinyl monomer), ECO (epichlorhydrin rubber) and/or silicone.

The cover assembly according to the invention can be advantageously used in combustion engines, especially as an enclosure for a cylinder head of a combustion engine of a vehicle, especially of a utility vehicle, preferably of an autobus or a truck. The division of the elements of the air-oil separation to the frame and the lid or the possibility of a separate removal of a cyclone pipe shows its advantages especially with a upright installation of the engine, and especially in situations where the driver's cabin cannot be inclined for an inspection or repair of the engine. The use of engines with cover assemblies according to the invention is of course not limited to these applications. In view of the small quantities of these engines—compared to passenger cars—there is an attempt to use such engines also in other applications, e.g. as stationary engines. Although the advantages relating to space cannot be fully used in these applications, they nevertheless at least take profit of the simultaneous sealing.

BRIEF DESCRIPTION OF THE DRAWINGS

In the following, the invention shall be further described in the context of some drawings. The drawings are of schematic character and describe only some advantageous embodiments, the invention is however not limited to them. In the drawings, identical reference numbers refer to identical parts. The figures show:

FIG. 3 A sectional view of a cover assembly according to the invention with lid, frame and an air-oil separator, namely a cyclone;

FIG. 4 In two partial drawings sectional views of a cover assembly according to the invention with lid, frame and an air-oil separator, namely a cyclone;

FIG. 5 In two partial drawings top-views to a gasket for a cover assembly according to the invention;

DETAILED DESCRIPTION OF THE INVENTION

Figure 1:
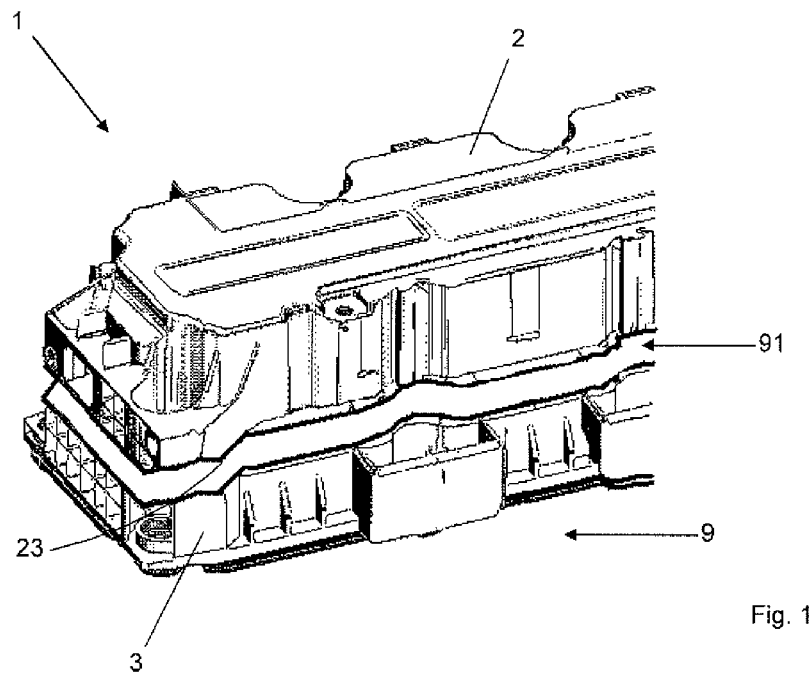
FIG. 1 An inclined view of a cover assembly with a lid and a frame.

FIG. 1 schematically shows an inclined view to a cover assembly 1, consisting in a lid 2 and a frame 3, which aims on covering a cylinder head; the cylinder head is roughly indicated with reference number 9. Lid 2 and frame 3 here are shown in an exploded view but without the gasket to be installed between them. The free edge 23 of the lid 2 points towards the frame 3. In their intermediate space, a partition plane 91 is indicated. When the parts are mounted to each other in their mounting direction, a gasket usually is taken up in a groove in a first part and rests on the surface of the other part, so that immediately at the sealing line, no overlap of the parts occurs. FIG. 1 shows the cover assembly only from the outside so that air-oil separators which might be present on the inside of the cover assembly cannot be seen.

Figure 2:
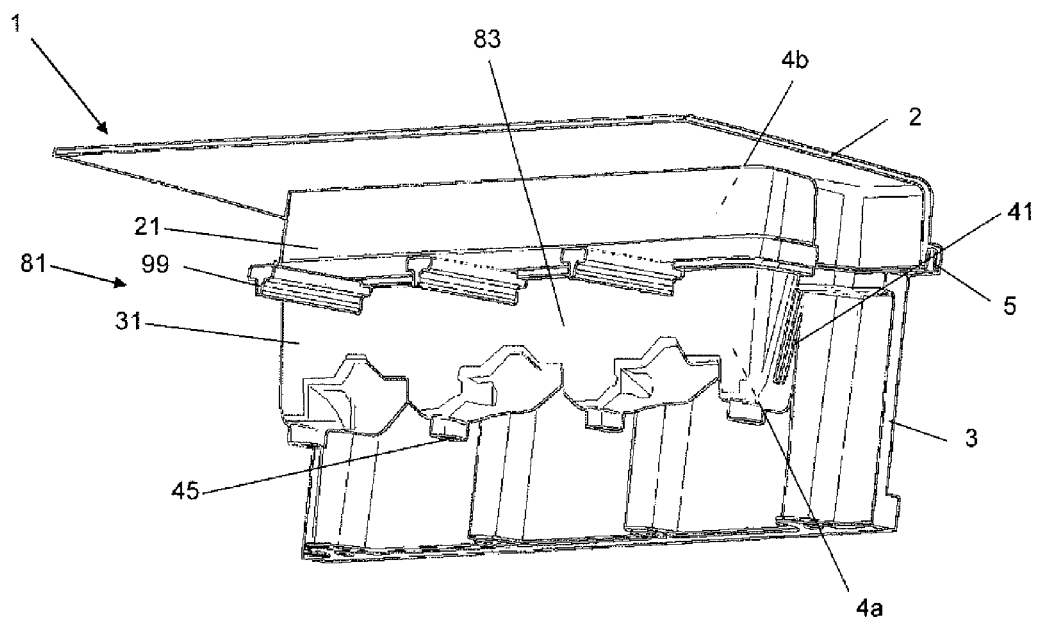
FIG. 2 A partial view of the inner chamber of a cover assembly according to the invention with lid, frame and compartment.

FIG. 2 represents a section through an area of a cover assembly 1 according to the invention. Here, a compartment 81 is divided from the inner space along a lateral wall which wall is formed by the frame 3 and the lid 2. The compartment 81 consists in a frame compartment 31 and a lid compartment 21. Apart from the outer wall, which is formed by the frame 3 and the lid 2, a partition wall 83 delimits the compartment. The partition wall also consists in two parts. Frame 3 and lid 2 are sealed against each other by a gasket 5 in the same way as in continuation thereof the frame compartment 31 is sealed against the lid compartment 21. Within the compartment 81, air-oil separator elements are located which are not further defined in this sketch but by four outlets for separated oil 45 which are visible on the lower side of the compartment 81 and an inlet 41 for brute crankcase ventilation gas on the front surface of the compartment 81. At least one element 4a of the at least one air-oil separator is at least in sections integrally formed with the frame 3. This element 4a is arranged inside the frame compartment 31. At least one other element 4b of the air-oil separator 4 is arranged at least in sections within the lid 2.

One embodiment of the invention is shown in detail in the sectional view in FIG. 3. The cover assembly 1 comprises a lid 2 and a frame 3, which are sealed against each other by a gasket 5. Within the cover assembly, a compartment 81 is divided off, which comprises a lid compartment 21 and a frame compartment 31 as well as the branched-off sections of the gasket 5 to be mounted between them. The air-oil separator 4 is formed as a counter-flow cyclone 43, with the wall of its funnel-shaped element 44 at least in sections simultaneously forming the partition wall 83 of the frame compartment 31. The funnel-shaped element 44 thus forms a first element 4a of the air-oil separator 4 which is integrally formed with the frame 3 and arranged inside the frame compartment 31. The cyclone itself is shown in a top-view. At the bottom end of the funnel-shaped element 44, an outlet 45a for separated oil is located. Within the lid compartment 21, a pipe for the removal of purified crankcase ventilation gas is installed; its end protruding from the cover assembly 1 can be identified on the right-hand side of the figure. The pipe thus forms another element 4b of the air-oil separator 4 which in sections is arranged in within the lid 2. The inlet for brute crankcase ventilation gas here is not shown. In this representation, it is obvious that in the overlapping area 90 where the frame 3 and the lid 2 overlap with each other, the corresponding compartments 21, 31 overlap, too. The height of the overlapping area 90 essentially corresponds to the height of the sealing groove, which ranges between 1 and 30 mm, especially between 5 and 14 mm. Moreover, round elevations 95 are visible, through which screws or bolts pass when the cover assembly 1 or the frame 3 is mounted at the cylinder head 9.

FIG. 4 in two partial figures depicts variations of the embodiment given in FIG. 3. Here, the cyclone 43 is also shown sectionally. The cylinder head 9 in both cases is only indicated at the bottom of the figure in a schematic manner. The cyclones of both embodiments on the left hand side show an inlet 41 for brute crankcase ventilation gas as well as a funnel-shaped element 44, at the bottom edge of which an outlet 45a for separated oil is located. Thus, the funnel-shaped element 44 as a first element 4a of the air-oil separator 4 together with a partition wall extending on the left side of the funnel-shaped element into the plane of the figure and sections of the frame 2 located on the right side of the funnel-shaped element form the frame compartment 21. It is essential for both embodiments that neither this partition wall nor the funnel-shaped element protrude beyond the upper edge of the frame 2. The embodiments are different in the design of the pipe 42 for the removal of purified crankcase ventilation gas. In both embodiments, at least sections of the pipe 42 as another part 4b of the air-oil separator 4 are arranged within the lid 2. While the transversely extending section of pipe 42 in the embodiment of FIG. 4-a is mainly located in the area of the lid 2 in the edge region of the lid facing the frame 3 and is formed as one-piece, the transversely extending section 42 in the embodiment of FIG. 4-b is formed in a segmented manner. In the first mentioned case, it is necessary that sufficient space is provided for the removal of the lid that the lid 2 can be taken off across the pipe 42. The pipe may then be dismounted independent of lid and frame. The latter-mentioned solution shows its advantages with even smaller space/height. The upper section 42a of the pipe can be removed together with the lid 2, while the lower section can be designed either to be removed separately or together with the frame 3. Here, the outlet pipe 42 of the cyclone 43 does not contribute to the height.

Now, FIG. 5 in two partial figures schematically shows gaskets 5 for a cover assembly 1 according to the invention. FIG. 5-a essentially shows a gasket 5 for sealing the embodiment of a cover assembly given in FIG. 4-b. Here, two sections 51 branch off for the sealing of the compartment sections, namely of the frame compartment against the lid compartment, which comprise further branchings for sealing of the funnel-shaped elements of the cyclone. Other than in the embodiment of FIG. 4-b, here a lid compartment is additionally provided. The other branched sections 52 aim on sealing of the pipe sections 42a, 42b against each other. The partial FIG. 5-b shows a gasket for a considerably simpler embodiment of the cover assembly 1. Here, only one sealing section 51 branches off from the actual, frame-shaped gasket, which section extends in parallel to the longer sides of the gasket 5. The sealing section 51 connects the two shorter sides of the gasket with each other. This sealing section aims on sealing of the partition walls of frame and lid compartment 21, 31. When considering the width of the frame-shaped gasket 5, the sealing section 51 extends at about one fourth of the width of the frame-shaped gasket, as the compartment itself only extends over about one fourth of the total width of the cover assembly.

Figure 6:
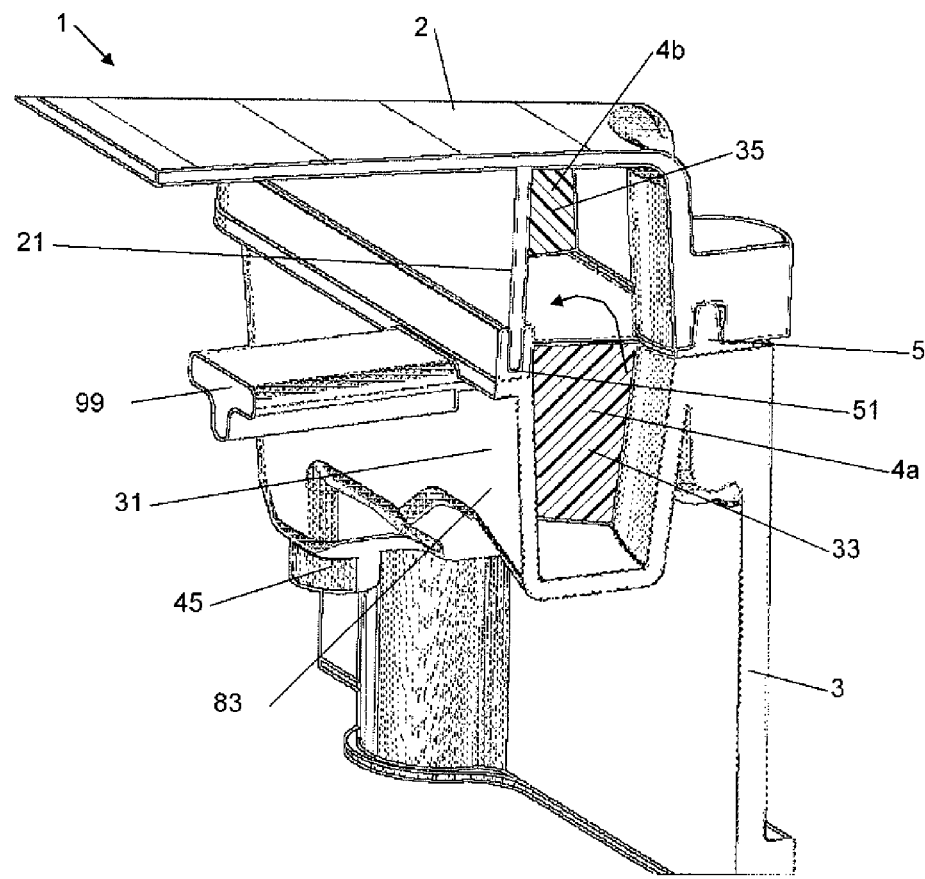
FIG. 6 A sectional view of a cover assembly according to the invention with lid, frame and an air-oil separator, namely a labyrinth-like air-oil separator formed by walls.

FIG. 6 illustrates a further embodiment of the invention. Here, a partition wall 83 separates the compartment 81 within the cover assembly over the complete section shown. A guiding element 99 for cables etc. branches off the partition wall 83, which merges with the outer wall of the cover assembly 1, which outer wall is however not shown in the section depicted. This way, a further stabilisation of the cover assembly 1 is achieved. Within the frame compartment 31, a first wall 33 is visible, which extends over the complete cross section of the frame compartment 31. A second wall 35, which is offset backwardly relative to this wall 33, extends within the lid compartment 21, which extends over the complete cross section of the lid compartment 21. The crankcase ventilation gas to be cleaned flows from the spectator into the figure and is redirected behind the wall 33 in such a manner that it can flow through the area left free by the second wall 35, as is indicated with the bent arrow. These redirections cause that (oil-)particles are separated from the gas because of the different accelerations of gas and (oil-)particles. The gas flows further into the figure and may be redirected by a further wall, while the separated oil and other particles which may be present are led away through the outlet 45. The walls 33, 35 here thus act as air-oil separator 4. Wall 33 corresponds to a first element 4a of the air-oil separator 4 which is integrally formed with the frame. Wall 35 corresponds to a second element 4b of the air-oil separator 4 which in this case is completely arranged within the lid 2.

Figure 7:
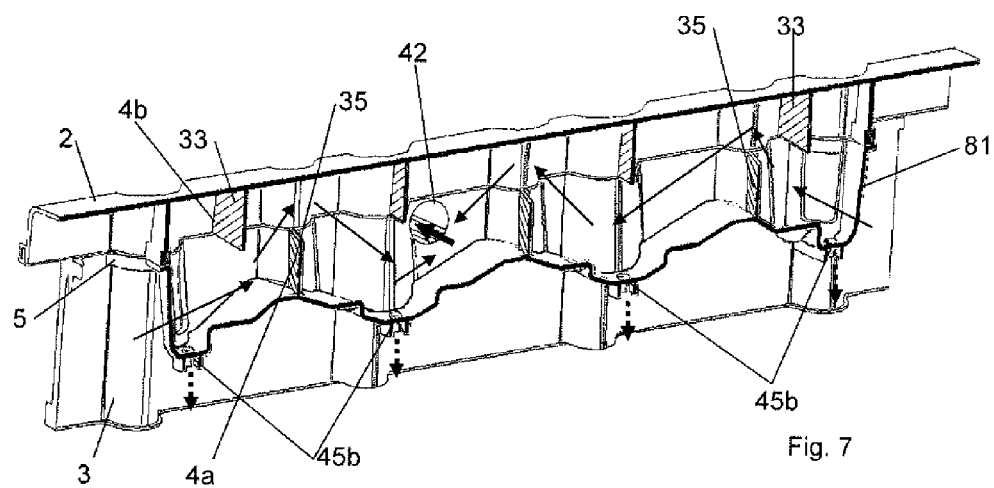
FIG. 7 Another sectional view of a cover assembly according to the invention with lid, frame and an air-oil separator, namely a labyrinth-like air-oil separator formed by walls.

FIG. 7 shows a cover assembly 1, in which the air-oil separator is again formed by the walls 33, 35, . . . . To be more precise, the compartment 81 shown in a sectional view comprises even two air-oil separation systems, as one crankcase ventilation flow enters from the right hand side and a second crankcase ventilation flow enters from the left hand side. The gas flow is indicated by solid arrows, the dotted arrows indicate the flow of the oil droplets. In both systems, the gas is redirected when passing through the walls 33, 35, . . . , so that it flows through the passage openings left free in the walls 33, 35, . . . . After their passage of the air-oil separation system, the gas flows leave via the pipe 42 or are fed back to the system via this pipe 42. Separated oil exits via the openings 45b or is led to the oil pan from there. The air-oil separation system on the right-hand side is different from the one on the left-hand side in that the former comprises four walls 33, 35, . . . , while the latter is limited to three walls 33, 35, . . . . Further, the inclination angles and distances of the walls 33, 35 are different. In both air-oil separation systems, the walls 33 which constitute first parts 4a of the air-oil separator 4 are arranged in the frame compartment 31 or formed integrally with the frame 3 do not protrude beyond the upper edge of the frame, while the walls 35 located in the lid compartment 21 or integrally formed with the lid as further parts 4b of the air-oil separator 4 do not project beyond the lower edge of the lid 2. In this embodiment of the invention, it is sufficient if the lid 2 and the frame 3 as well as the lid compartment 21 and the frame compartment 31 are sealed against each other with a gasket 51 with a branching section 51, as is illustrated in FIG. 5-b. A sealing of the air-oil separator itself or within the air-oil separator her is not required, as the walls 33, 35 have no immediate continuation in the respective other compartment.

Figure 8:
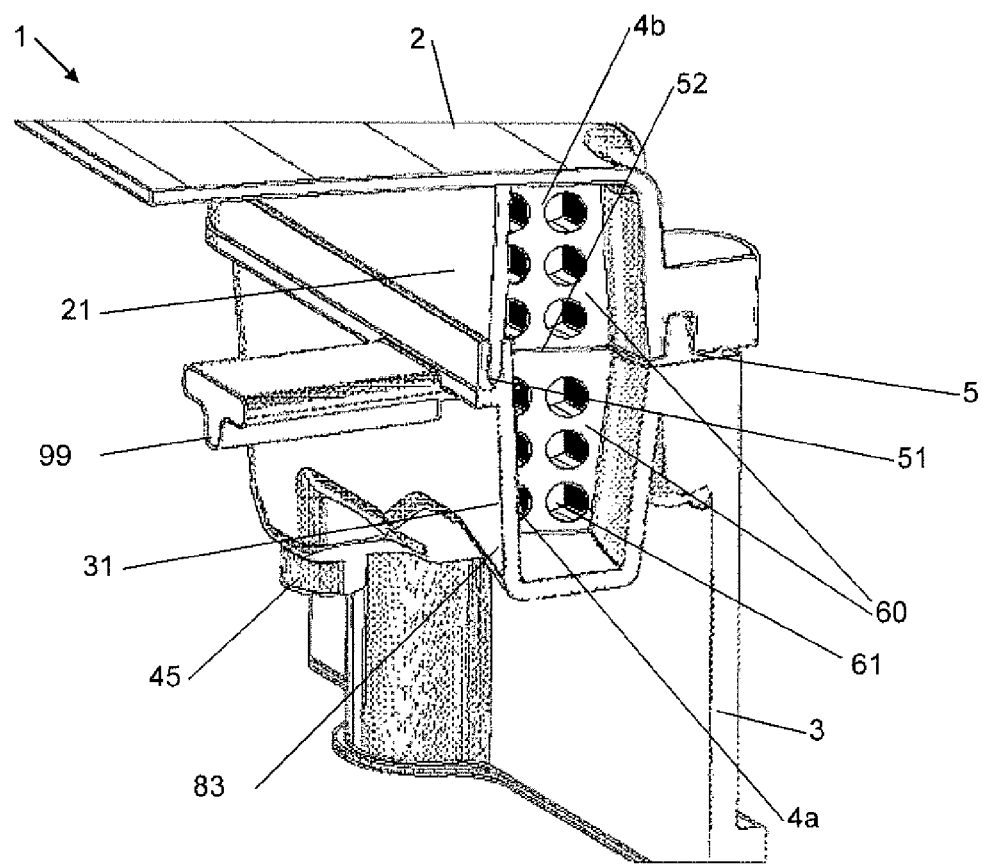
FIG. 8 A sectional view of a cover assembly according to the invention with lid, frame and an air-oil separator, namely an air-oil separator formed by passage openings in a wall.

A further embodiment of the invention can be explained with FIG. 8. The general design of the cover assembly 1 to the widest extent corresponds to the one of FIG. 6. Here, the air-oil separator does however not consist in walls 33, 35 leaving passage openings in the respective complementary compartment so that the crankcase ventilation gas to be cleaned passes between the walls and undergoes several redirections, but it is formed by a wall 60, which consists in two sections, one of which extends over the complete cross section of the lid compartment 21 forming part 4b of the air-oil separator 4 and the other over the complete cross section of the frame compartment 31 and forming part 4a of the air-oil separator 4, with both sections being connected to each other via a sealing section 52. Within the wall 60, a plurality of passage openings 61 is formed, so that the crankcase ventilation gas to be cleaned has to pass through them. Here, a reduction of the cross section takes place and the gas undergoes an acceleration, which causes a separation of (oil-)particles from the gas. In a first advantageous embodiment, the passage openings 61 are designed cylindrically. In an alternative embodiment, the passage opening are provided with a cross section that tapers in the passage direction, e.g. conically, so that the effects are enhanced or that the same effects can be achieved with a smaller number of passage openings.

In a further embodiment of the invention, an impaction wall 70 is arranged behind the wall 60. The impaction causes that (oil-)particles which are still carried in the gas, thus which have not been separated in the passage openings 61, can be separated. The impaction wall is preferably divided into sections, which extend either only in the lid or in the frame. The impaction wall can be formed by the lid and the frame themselves, be integrally formed with them or consist in additional, inserted parts.

Figure 9:
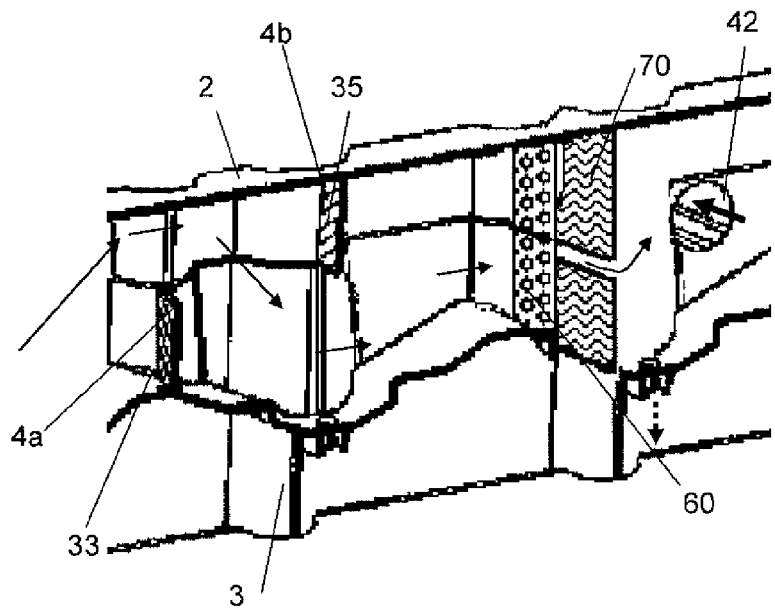
FIG. 9 A sectional view of a cover assembly according to the invention with lid, frame and two air-oil separators arranged one behind the other.

FIG. 9 combines the air-oil separation systems explained before in a further embodiment of the cover assembly 1 according to the invention. As in FIG. 7, a sectional view through a compartment 81 is shown. The inlet of the crankcase ventilation gas to be cleaned is realized from the left. As a preseparator, two consecutive walls 33, 35 which are alternatingly arranged in the frame 3 and the lid 2, which walls are integrally formed with the frame 3 and the lid 2, respectively. The main separator is formed by a two-part wall 60 with passage openings 61, behind which an impaction wall 70 is arranged. The surface of the impaction wall which points towards the wall 60 is provided with an absorbing material. The impaction wall is also formed from two parts with a wall section in the lid 2 and another wall section in the frame 3 and a gap between the wall sections which allows for the continued guidance of the purified gas. The removal of the gas is effected via the pipe 42, separated oil is removed through the openings 45b. As already explained in the context of FIGS. 6 and 7, the walls or their sections only extend in the lid compartment 21 or in the frame compartment 31, respectively, so that the lid can be removed from the frame 3 without a large demand in space.

Figure 10:
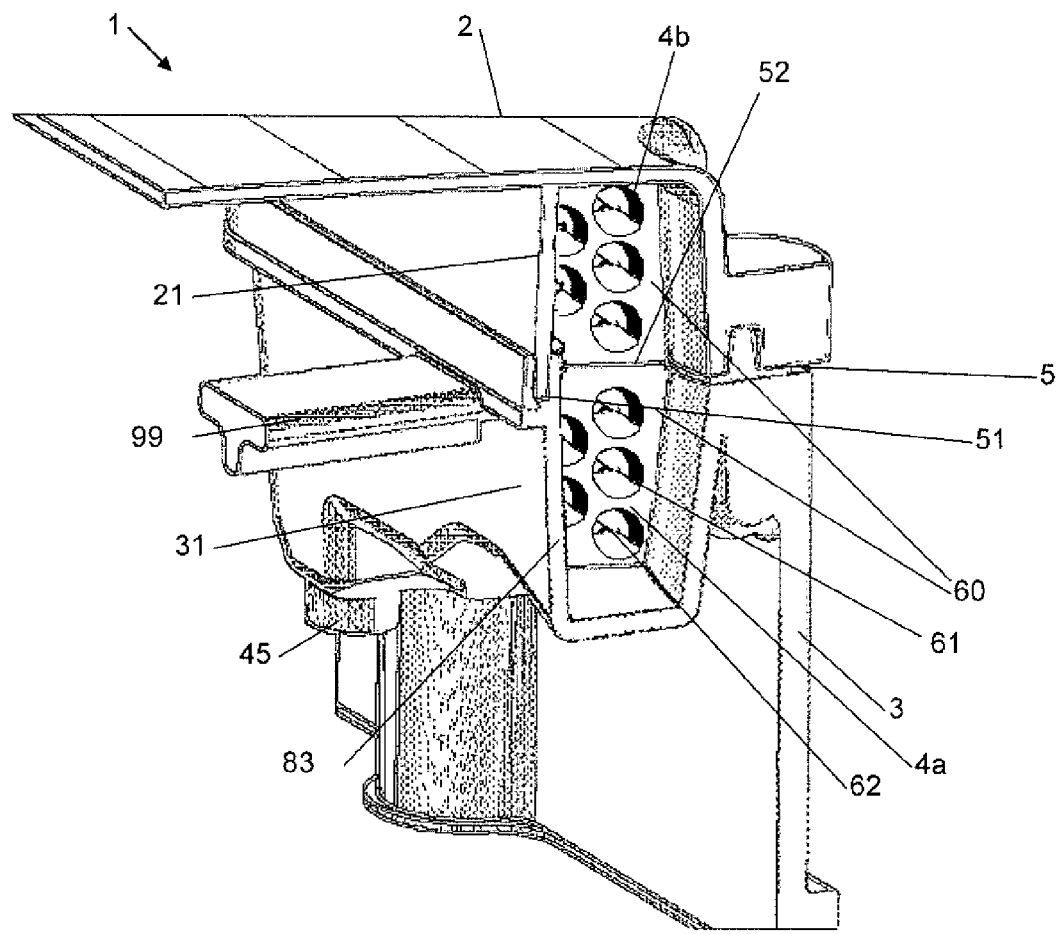
FIG. 10 A sectional view of a cover assembly according to the invention with lid, frame and an air-oil separator, namely an air-oil separator formed by passage openings in a wall and helix-shaped elements arranged in these openings.

FIG. 10 varies the embodiment given in FIG. 8 in such a manner that the wall 60 does not only comprise passage openings 61, but helix-shaped elements 62 are arranged in these passage openings. With the helix-shaped design of the passage openings, the separation is further enhanced, so that the consecutive impaction wall can often be dispensed with. Nevertheless, a combination with a consecutive impaction wall is possible, too. Again, the wall 60 is divided in such a way that one section is formed in the lid compartment 21 and the other section in the frame compartment 31. The wall sections 60 can be integrally formed with the frame 3 or the lid 2, respectively; the helix-shaped elements in this case are inserted as separate elements. On the other hand, it is possible to insert the wall sections 60 into the frame 3 or lid 2, respectively. In this case, it is preferred if the helix-shaped elements 62 are integrally formed with the wall sections. From a production perspective, it is preferred that the helix-shaped elements 62 show a rotation of the threaded surface of 180° or less. As an alternative, two such wall sections with integral helix-shaped elements 62 can be arranged one behind the other, that the passage openings 60 are flush with each other. This way it is possible on the one hand that the helix-shaped elements arranged one behind the other have a rotation of the threaded surfaces of 360°, on the other hand, they can show inverse rotational directions of the threaded surfaces. In the same way, it is possible to rotate the outlet of the first helix-shaped element relative to the inlet of the second helix-shaped element.

Figure 11:
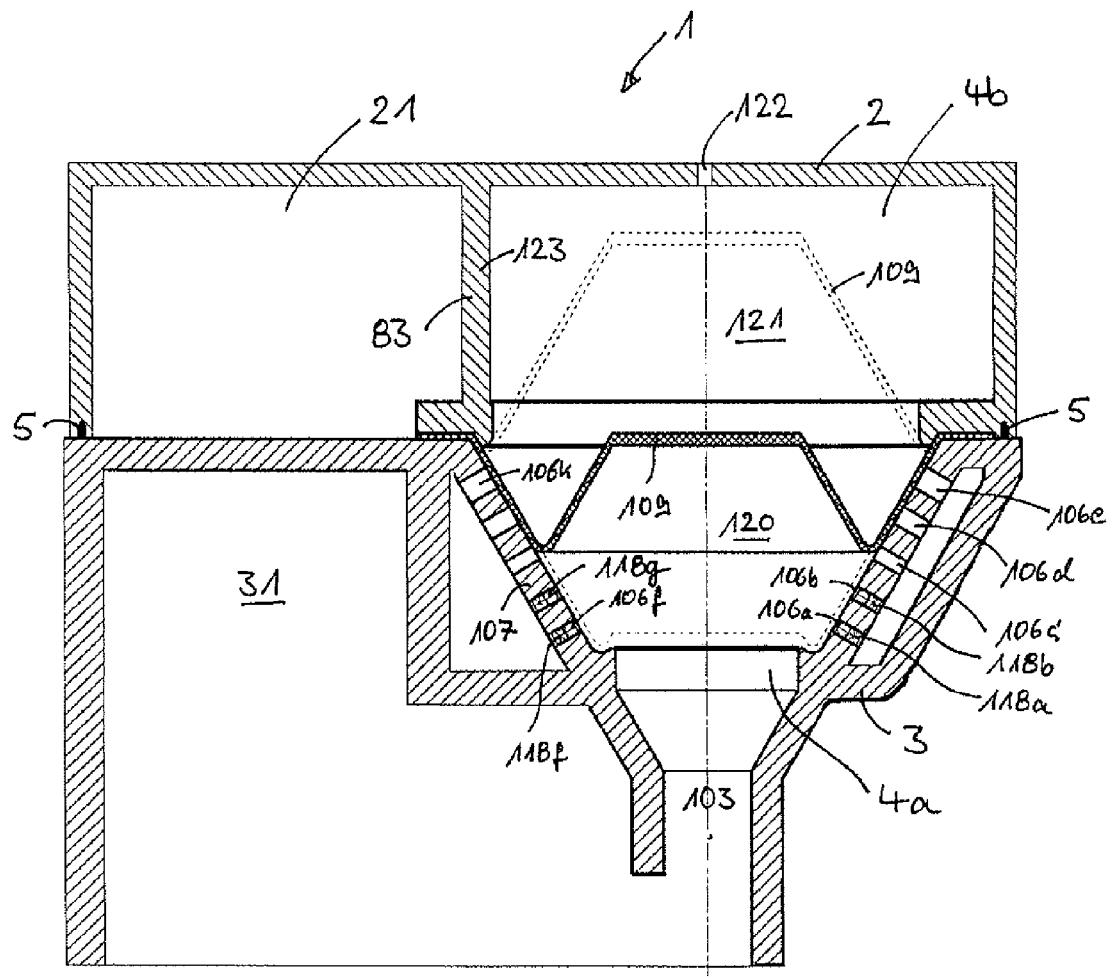
FIG. 11 A sectional view of a cover assembly according to the invention with lid, frame and air-oil separator.

FIG. 11 shows a further embodiment of the invention. The design of the cover assembly 1 to the widest extent corresponds to the cover assembly according to FIG. 6. Different to FIG. 6, the air-oil separator comprises two compartments 120 and 121, which are separated by a flexible rolling membrane 109. The air oil separator fully corresponds to the air oil separators as disclosed in DE 10 2007 012 483 A1, the disclosure of which is herewith incorporated with respect to the design of all aspects of the air oil separator by reference. The compartment 120 is limited by wall 107 and connected to the gas intake 103 while the compartment 121 encloses a gas with reference pressure. By providing a hole 122 in the wall of lid 2, the reference pressure in FIG. 11 is atmospheric pressure.

Depending on the pressure relation between the intake compartment 120 and the reference compartment 121, the rolling membrane 109 moves down or up along the walls 107 of the lower compartment 120. The wall 107, which separates compartment 120 from the rest of the frame compartment 31 comprises holes 106a to 106k, which act as gas outlets from the intake compartment 120. Each of these holes further acts as oil separators for oil mist or oil drops contained in the gas. The oil separating efficiency of these holes can be improved by inserting into holes 106a to 106k or at least in some of these holes oil separating elements 118a, 118b, 118f and 118g. In FIG. 11 not all holes 106a to 106k have been supplemented with reference signs for the sake of better readability of FIG. 11.

If the pressure in compartment 120 decreases and the pressure difference in the intake compartment 120 and the reference compartment 121 diminishes (the pressure in compartment 120 being higher than the pressure in compartment 121), the membrane 109 shifts down and thereby closes more and more of the outlet holes 106a to 106k. Thereby, the gas volume flowing through the oil separator is decreased. If the pressure difference increases, the membrane 109 is lifted and thereby opens and more and more of holes 106a to 106k, leading to a reduction in the pressure difference and larger gas volumes flowing through the gas oil separator.

As shown in FIG. 11, the diameter of holes 106a to 106e and the diameters of holes 106f to 106k gradually increase thereby providing a larger cross section for the gas to flow through. Thereby, the pressure drop over the wall 107 decreases not only with the increasing number of open holes 106a to 106k, but also with increasing cross sections of these holes.

Additionally, in order to provide improved oil separation, holes 106a to 106k may be provided with further oil separating elements. These oil separating elements may be arranged only in some holes, e.g. in holes 106a, b, f, g as in FIG. 11, which usually remain open and only are closed by membrane 109 if the pressure difference between the intake compartment 120 and the reference compartment 121 is extremely low or negative. In FIG. 11 holes 106c to 106e and 106h to 106k do not contain such oil separating elements, in order to allow a high volume of gas to be transmitted and cleaned in a state, where the pressure difference between intake compartment 120 and 121 is large. Thus, the oil separator in FIG. 11 controls the pressure drop over wall 107 as well as the gas volume flowing through wall 107 automatically in correspondence with the needs for e.g. an oil separator for exhaust gases of a combustion engine.

The invention claimed is:

1. A cover assembly for covering a cylinder head, comprising a lid, a frame, at least one air-oil separator and at least one frame compartment, which is delimited in part by the frame and in part by a partition wall branching off the frame, with at least one element of the at least one air-oil separator at least in sections being integrally formed with the frame and arranged inside the frame compartment and where another element of the air-oil separator is arranged integrally at least in sections within the lid, wherein said air-oil separator elements meet to form a sealing section; wherein said at least one frame compartment comprises at least one frame compartment wall arranged within the at least one frame compartment wherein the at least one frame compartment wall acts as an air-oil separator, with the at least one frame compartment wall extending transversely to the flow direction of crankcase ventilation gas and wherein one of the at least one frame compartment wall comprising a plurality of passage openings in said one frame compartment wall to act as an air-oil separator, wherein said plurality of passage openings are aligned transverse to the flow direction of the crankcase ventilation gas.

2. The cover assembly according to claim 1, further comprising a gasket being circumferentially arranged between the lid and the frame with the edge of the frame circumferentially adjoining to the free edge of the lid with the gasket being clamped between the free edge of the lid and the frame.

3. The cover assembly according to claim 2, wherein the lid comprises a lid compartment, which is integrally formed with the lid, with the other element of the air-oil separator being arranged within the lid compartment.

4. The cover assembly according to claim 3, wherein the gasket comprises sections which branch off, with the branched sections of the gasket in the mounted state of lid and frame sealing the lid compartment against the frame compartment.

5. The cover assembly according to claim 4, wherein the frame compartment comprises at least one inlet for oil-carrying crankcase ventilation gases, which inlet points towards an inner chamber of the cover assembly.

6. The cover assembly according to claim 5, wherein the cover assembly comprises at least one outlet for purified crankcase ventilation gas, which outlet points towards the outer space of the cover assembly.

7. The cover assembly according to claim 6, wherein the outlet is integrally formed with the frame or the lid.

8. The cover assembly according to claim 7, wherein the at least one air-oil separator is a cyclone with at least one funnel-shaped element which is integrally formed with the frame and which is arranged inside the frame compartment.

9. The cover assembly according to claim 8, wherein the at least one air-oil separator comprises an inlet pipe which at least in sections is integrally formed with the frame.

10. The cover assembly according to claim 8, wherein the at least one funnel-shaped element comprises an outlet for separated oil, with the outlet being located at the tip of the funnel-shaped element.

11. The cover assembly according to claim 3, wherein the at least one air-oil separator comprises an outlet pipe for purified crankcase ventilation gas, with the outlet pipe being sectionally located within the frame compartment and sectionally located within the lid compartment, with the outlet pipe after removal of the lid being independently removeable and mountable from and to the frame.

12. The cover assembly according to claim 1, wherein a main compartment comprises at least one wall, which wall is arranged within the main compartment and which acts as an air-oil separator, with the wall extending transversely to the flow direction of the crankcase ventilation gas.

13. The cover assembly according to claim 12, wherein the at least one wall extends only in sections between the lower end of the frame compartment and an inner ceiling of the lid.

14. The cover assembly according to claim 1, wherein the cover assembly comprises a first wall and at least a second wall arranged one behind the other in a flow direction of the crankcase ventilation gas, with the first and second walls extending transversely to the flow direction of the crankcase ventilation gas and with the second wall in a projection into the plane of the first wall leaves another passage opening open than the passage opening delimited by the first wall.

15. The cover assembly according to claim 14, wherein the first and second walls are arranged one behind the other in the flow direction of the ventilation gas which walls are alternatingly arranged in the lid compartment and in the frame compartment and this way form a labyrinth-shaped air-oil separator.

16. The cover assembly according to claim 1, wherein the at least one frame compartment wall comprises two sections, with one section extending over the complete cross section of the lid compartment and the other section extending over the complete cross section of the at least one frame compartment.

17. The cover assembly according to claim 16, wherein an impaction wall is arranged behind the at least one frame compartment wall in the flow direction of the crankcase ventilation gas, which impaction wall may be identical with the wall of the frame or the lid.

18. The cover assembly according to claim 17, wherein a surface of the impaction wall pointing towards the at least one frame compartment wall at least in section comprises an absorbing material.

19. The cover assembly according to claim 18, wherein the absorbing material is a fleece.

20. The cover assembly according to claim 1, wherein at least one of the passage openings comprises at least one helix-shaped element as a further air-oil separator.

21. The cover assembly according to claim 20, wherein the helix-shaped element comprises a rotation of the threaded surfaces of up to 180°.

22. The cover assembly according to claim 20, wherein the helix-shaped element comprises a rotation of the threaded surfaces of up to 360°.

23. The cover assembly according to claim 20, wherein at least one of the passage openings comprises two helix-shaped elements arranged one behind the other, with a first helix-shaped element in the flow direction of the crankcase ventilation gas showing another rotation direction than a second helix-shaped element in the flow direction of the crankcase ventilation gas.

24. The cover assembly according to claim 1, wherein the cover assembly, in the area of the frame compartment, in the area in the flow direction of the crankcase ventilation gas, and behind at least one first wall comprises an outlet for separated oil.

25. The cover assembly according to claim 1, wherein the frame compartment extends along a longitudinal wall of the frame.

26. The cover assembly according to claim 12, wherein the main compartment extends over at the most half of the width of the frame.

27. The cover assembly according to claim 1, wherein at least one part of the group consisting of the lid, the frame and the main compartment comprises thermoplastic material.

28. The cover assembly of claim 27, wherein the thermoplastic material is a polyamide.

29. The cover assembly according to claim 1, wherein at least one part of the group consisting of the lid, the frame or the main compartment comprises a metallic material.

30. The cover assembly according to claim 29, wherein the metallic material is an aluminium alloy.

31. The cover assembly according to claim 1, wherein the gasket is a profiled rubber gasket and is constructed of materials selected from the group consisting of FPM (fluoroelastomere rubber), FVMQ (fluorosilicone rubber), polyacrylates, especially ACM alkyl acrylate copolymer, AEM (ethylene acrylic rubber), of HNBR (hydrated nitrite butadiene rubber), NBR (nitrile butadiene rubber), EVM (Ethylene-vinyl monomer), ECO (epichlorhydrin rubber) and silicone.

32. The cover assembly according to claim 1, wherein said plurality of passage openings are cylindrical or conical.

* * * * *